United States Patent
Oxenham

[11] 3,810,546
[45] May 14, 1974

[54] APPARATUS FOR CONTROLLING A POLLUTING LIQUID

[75] Inventor: James Preston Oxenham, Houston, Tex.

[73] Assignee: Shell Oil Company, New York, N.Y.

[22] Filed: Mar. 28, 1973

[21] Appl. No.: 345,801

Related U.S. Application Data

[63] Continuation of Ser. No. 206,544, Dec. 9, 1971, abandoned, which is a continuation of Ser. No. 70,745, Sept. 9, 1970, abandoned.

[52] U.S. Cl............................ 210/242, 210/DIG. 21
[51] Int. Cl............................................ E02b 15/04
[58] Field of Search ....... 210/83, 242, DIG. 21, 169

[56] References Cited
UNITED STATES PATENTS

3,635,342   1/1972   Mourlm et al................. 210/242 X
3,688,909   9/1972   Titus et al..................... 210/DIG. 21

FOREIGN PATENTS OR APPLICATIONS

1,284,363   4/1969   Germany ..................... 210/DIG. 21

Primary Examiner—Samih N. Zaharna
Assistant Examiner—T. A. Granger

[57] ABSTRACT

There is disclosed apparatus for removing a pollutant, e.g., polluting liquid, floating on the surface of a body of water. The invention uses a skimmer utilizing liquid movement theretoward to facilitate separation of the polluting liquid from the water. The skimmer is arranged to remove the polluting liquid from all directions. The invention further uses means for circulating water adjacent the polluting liquid/water interface to present moving liquid to the skimmer approaching from all directions.

1 Claim, 2 Drawing Figures

PATENTED MAY 14 1974    3,810,546

INVENTOR
JAMES PRESTON OXENHAM

BY   Harold L. Dinkler
ATTORNEY

APPARATUS FOR CONTROLLING A POLLUTING LIQUID

This is a continuation, of application Ser. No. 206,544, filed Dec. 9, 1971 now abandoned; which in turn is a continuation of application Ser. No. 70,745, filed Sept. 9, 1970 now abandoned.

BACKGROUND OF THE INVENTION

The provision of means to skim oil or other polluting liquids from the surface of a water body is well known in the art. Skimmers of the prior art have generally been unidirectional devices dependent upon water movement in the form of current or waves in the operative direction to skim the polluting liquid from the water surface. Pumps and the like have been used to withdraw liquid from the skimming device which secondarily act to induce movement of the polluting liquid theretoward. To use this approach primarily to induce water movement toward the skimmer to maximize pollutant removal has been self-defeating. As larger quantities of liquid are withdrawn from the skimming device, the proportion of polluting liquid removed generally declines.

SUMMARY OF THE INVENTION

It is an object of this invention to provide apparatus for removing a polluting liquid from the surface of a second liquid which induces movement of the polluting liquid toward a skimming device from a plurality of directions.

Another object of the invention is to provide an apparatus for skimming a polluting liquid from the surface of a water body which substantially increases the quantity of pollutant removed while maintaining the liquid handled by the device within reasonable limits.

Another object of the invention is to provide an apparatus for removing polluting liquids from the surface of a water body including a multidirectional skimmer and means for circulating the water to present moving liquids to the skimmer from a plurality of directions.

In summary, the apparatus of this invention comprises a skimmer having means for removing a polluting liquid from the surface of a second liquid moving theretoward from at least two directions and means for circulating the second liquid to present moving liquid to the skimmer from at least the two directions. The method of this invention comprises inducing horizontal flow of an underlying liquid toward a predetermined area from a plurality of directions to move a floating polluting liquid theretoward; skimming the polluting liquid from the underlying liquid during approach to the floating liquid toward the predetermined area; and inducing a downward flow of the second liquid from the predetermined area.

DESCRIPTION OF PREFERRED EMBODIMENT

Figure 1:
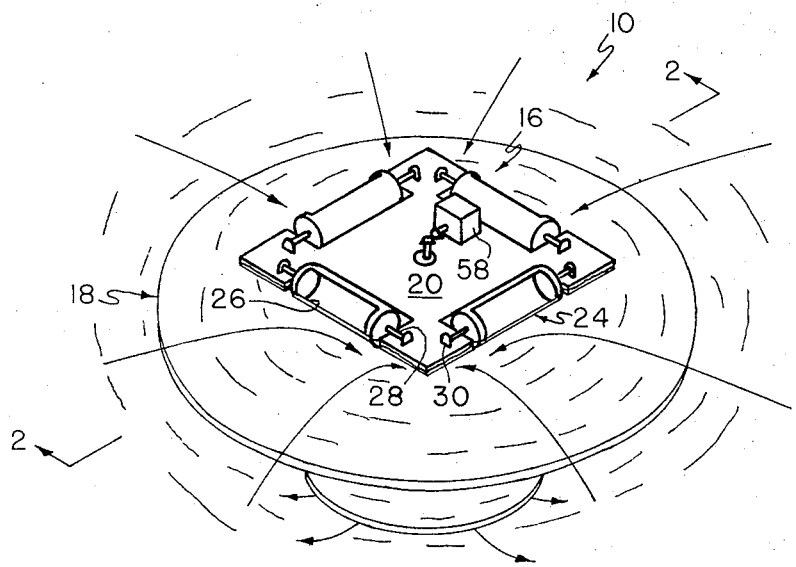
FIG. 1 is an isometric view of the invention illustrating the removal of polluting liquids from all directions.

Attention is directed to the drawing wherein there is shown an apparatus 10 for removing a layer of polluting liquid 12 from a body of water 14. The apparatus 10 comprises as major components a skimmer 16 having the capability of skimming the polluting liquid 12 from a plurality of different directions and a circulating device 18 for moving water toward the skimmer 16 from a plurality of directions. It should be apparent that the device 10 may be used to skim any liquid floating on the surface of a second liquid, even though the polluting liquid 12 is generally a hydrocarbon while the liquid body 14 is normally water.

The skimmer 16 may be of any suitable type, the only requirement being the capability of skimming a floating liquid moving theretoward from at least two directions. Preferably, the skimmer 16 is omnidirectional, i.e., has the capability of removing the polluting liquid 12 from at least four mutually perpendicular directions.

Any suitable type of skimmer having this capability may be used in this invention. The skimmer disclosed in this application comprises a platform 20 having a plurality of floats 22 thereon and a plurality of rotatable drums 24 spaced about the periphery of the platform 20. The drums 24 face in mutually perpendicular directions and each comprise a weir 26 positioned adjacent the interface of the liquids 12, 14 to allow a substantial amount of the polluting liquid 12 to pass into the drums 24. Each of the drums 24 is mounted for rotation about the axis thereof by a suitable shaft 28 and supports 30 on the platform 20.

Inside each drum 24 is a buoyant member 32 which acts to adjust the level of the weir 26 to maintain the weir 26 adjacent the interface of the liquids 12, 14. Suitable means (not shown), such as pipes and pumps, are provided to remove the liquid accumulating in the drums 24 to a storage location (not shown) for ultimate disposal. It will be seen that the skimmer 16 comprises means for removing the polluting liquid 12 from the water 14 upon movement thereof toward the skimmer 16 from at least two directions.

The circulating means 18 comprises an important feature of this invention and is adapted to circulate the water 14 to present moving liquid to the skimmer 16 from at least two directions corresponding to the directionality of the skimmer 16. Preferably, the circulating device 18 comprises means for moving water toward the skimmer 16 from the four directions corresponding to the directionality thereof or for moving water radially toward the skimmer 16 from all directions.

Figure 2:
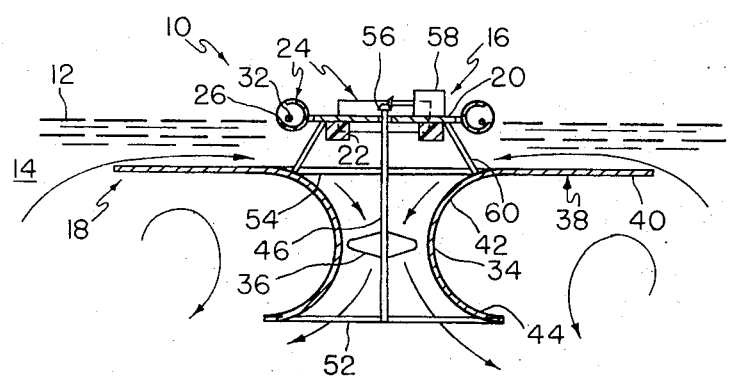
FIG. 2 is a cross sectional view of FIG. 1 taken substantially along line 2—2 thereof as viewed in the direction indicated by the arrows.

To this end, the circulating device 18 comprises a vertical duct 34 positioned below the skimmer 16 having an upper end submerged in the water 14. The circulating device 18 also comprises an impeller 36 for moving water downwardly through the duct 34. The circulating device 18 further preferably comprises a generally horizontal flow directing member 38 comprised of a generally planar annular section 40 and a transition section 42 merging with the duct 34 adjacent the upper end thereof. It will be apparent that the flow directing member 38 directs water horizontally toward the skimmer 16. The flow directing member 38 preferably extends substantially beyond the periphery of the skimmer 16 as shown best in FIG. 2. The duct 34 may comprise an outwardly flared lower end 44 so that the circulating device 18 comprises a streamlined shroud providing horizontal water flow from all directions and downward water flow immediately beneath the skimmer 16.

The impeller 36 is secured to a suitable shaft 46 journalled in spaced bearings (not shown) carried by a plurality of suitable bracing elements 52, 54. The shaft 46 may be driven in any suitable manner, as by extending the shaft 46 through the platform 20 and providing a pinion gear arrangement 56 thereon driven by a suitable motor 58. It will be apparent that other modes of driving the shaft 46 are within the skill of those in the art. It will also be apparent that other suitable methods, e.g., jet pumps, can be used to induce a downward flow within the duct.

The circulating means 18 may be connected to the skimmer 16 by suitable braces 60 to utilize the buoyancy of the floats 22 to support the circulating means 18. In the alternative, the circulating device 18 may be moored to the bottom of the water body 14 and provided with ballast tanks (not shown) or the like which may be emptied of water by the use of compressed air to buoy the circulating device 18 adjacent the water surface. In this relationship, the skimmer 16 may be moored to the circulating device 18 or separately moored to the water bottom.

In the operation of this invention, the apparatus 10 is transported to the contaminated area and put into the water where it is desired to skim polluting liquids therefrom. The polluting liquid 12 passing over the weirs 26 into the drums 24 is removed in any convenient manner.

The motor 58 is started to drive the shaft 46 and consequently drive the impeller 36. The design of the impeller 36 and the rotational speed of the shaft 46 are selected to maintain a volume flow rate through the vertical duct 34 sufficiently low to prevent drawing the polluting liquid 12 downwardly through the duct 34. As water is moved downwardly through the duct 34, a low pressure area is generated immediately beneath the skimmer 16. Consequently, water flows horizontally above the annular member 40 into the top of the duct 34. As water adjacent the annular member 40 is moved horizontally toward the center of the skimmer 16, flow of the polluting liquid 12 in the same direction is thereby induced. The drums 24 consequently act to skim a substantial quantity of polluting liquid 12 from the water 14 during the approach of the polluting liquid 12 toward the predetermined central area of the skimmer 16.

The circulating means 18 consequently presents a substantially greater amount of polluting liquid 12 to the skimmer 16 for removal. The skimmer 16 is accordingly capable of removing substantially greater quantities of the polluting liquid 12 without handling a disproportionately greater amount of liquid through the skimmer 16. This is particularly important when the liquid removed from the skimmer 16 must be stored and subsequently rehandled as is normally the case.

It will be seen that this invention provides improved method and apparatus for removing a polluting liquid from the surface of a body of water. It can also readily be seen that while the invention has been described with respect to polluting liquid, the invention can be adapted for use with floating solid pollutants and harvesters.

I claim as my invention:

1. Apparatus for removing a pollutant from the surface of a liquid, which comprises:

weir skimming means for removing the pollutant from the surface of a liquid, said weir skimming means being self-floating, adjustable to remove all of the pollutant and some of the liquid laterally approaching the weir, and deployable to remove approaching pollutant from at least four mutually perpendicular directions; and means for laterally moving the liquid toward and under the skimming means by propelling liquid downward beneath the skimming means, whereby the downwardly moving liquid is replaced by laterally moving liquid carrying floating pollutant, said means for laterally moving the liquid toward and under the skimming means comprising a vertical duct below the weir skimming means having the upper end thereof submergible in the liquid and means for moving the liquid downwardly through the duct, and said means for laterally moving the liquid toward and under the skimming means having a generally horizontal flow-directing member adjoining the upper end of the vertical duct for directing the liquid horizontally toward the skimming means, the flow-directing member extending beyond the periphery of the skimming means, and an arcuate transition section between the flow-directing member and the vertical duct and an outwardly flared lower end section adjoining the vertical duct.

* * * * *